US012023297B2

(12) United States Patent
Tsukayama et al.

(10) Patent No.: US 12,023,297 B2
(45) **Date of Patent: *Jul. 2, 2024**

(54) FOOT-BASED MASSAGE APPARATUS

(71) Applicant: Sarga Bodywork LLC, Kailua, HI (US)

(72) Inventors: Daniel Tsukayama, Kailua, HI (US); Jivatma Massaguer Garcia, Kailua, HI (US)

(73) Assignee: SARGA BODYWORK LLC, Kailua, HI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/190,475

(22) Filed: Mar. 27, 2023

(65) Prior Publication Data

US 2023/0233406 A1 Jul. 27, 2023

Related U.S. Application Data

(63) Continuation of application No. 16/262,040, filed on Jan. 30, 2019, now Pat. No. 11,612,542.

(51) Int. Cl.
*A61H 37/00* (2006.01)
*A61G 13/00* (2006.01)

(52) U.S. Cl.
CPC ........... *A61H 37/00* (2013.01); *A61G 13/009* (2013.01); *A61H 2201/1284* (2013.01);
(Continued)

(58) Field of Classification Search
CPC ............ A61H 37/00; A61H 2201/1284; A61H 2201/1645; A61H 2203/0468; A61H 2205/081; A61H 2201/0161; A61H 2203/0456; A61H 1/0222; A61H 1/0292; A61H 39/04; A61H 1/008; A61G 13/009;
(Continued)

(56) References Cited

U.S. PATENT DOCUMENTS 1,623,670 A 4/1927 Frankenfeld
4,371,162 A 2/1983 Hartzell
(Continued)

OTHER PUBLICATIONS

Jiva Bodywork Modalities, http://www.jivabodywork.com/modalities.html, Sep. 2016.
(Continued)

*Primary Examiner* — Justine R Yu
*Assistant Examiner* — Matthew R Moon
(74) *Attorney, Agent, or Firm* — Young Basile Hanlon & MacFarlane, P.C.

(57) ABSTRACT

A method of administering a massage comprising providing a base member with a flexible member coupled to opposite sides of the base member. The base member is rested on top of a support surface so that connection points where the flexible member attaches to the base member are vertically disposed above the support surface. A patient is positioned on the base member and the support surface so that the patient is laying between the opposite sides of the base member. Force is delivered to the patient laying on the base member using a foot of a massage practitioner. The massage practitioner utilizes the flexible member to assist with balance of the massage practitioner while the force is delivered to the patient.

11 Claims, 5 Drawing Sheets

(52) U.S. Cl.
CPC ................ *A61H 2201/1645* (2013.01); *A61H 2203/0468* (2013.01); *A61H 2205/081* (2013.01)

(58) Field of Classification Search
CPC .... A61G 13/10; A61G 13/105; A61G 13/101; A63B 21/4037; A63B 21/4033; A63B 21/04; A63B 21/0407; A63B 21/0414; A63B 21/0422
USPC ............................................ 248/346.01, 687
See application file for complete search history.

(56) References Cited

U.S. PATENT DOCUMENTS

| | | | | |
|---|---|---|---|---|
| 4,787,630 | A | 11/1988 | Watson et al. | |
| 7,962,982 | B1 | 6/2011 | Fellrath | |
| 8,381,734 | B2 | 2/2013 | Hedges et al. | |
| 8,479,326 | B1 | 7/2013 | Roberts et al. | |
| 8,499,387 | B2 | 8/2013 | Gharieni | |
| 10,143,885 | B2 * | 12/2018 | DuMee ............ | A63B 23/03508 |
| 11,612,542 | B2 * | 3/2023 | Tsukayama ............ | A61H 37/00 601/1 |
| 2004/0045483 | A1 | 3/2004 | Hardee | |
| 2006/0112490 | A1 | 6/2006 | Chausse | |
| 2007/0087920 | A1 | 4/2007 | Dachraoui et al. | |
| 2007/0088232 | A1 * | 4/2007 | Corradini ............... | A61H 37/00 601/28 |
| 2012/0270709 | A1 | 10/2012 | Howard | |
| 2013/0125306 | A1 | 5/2013 | Andrews | |
| 2014/0052034 | A1 | 2/2014 | Marxer | |
| 2016/0296787 | A1 | 10/2016 | Kamins | |
| 2017/0172832 | A1 | 6/2017 | Rosario, Jr. et al. | |
| 2017/0174000 | A1 | 6/2017 | Dagrossa | |
| 2018/0116889 | A1 | 5/2018 | Tsukayama et al. | |
| 2018/0290002 | A1 | 10/2018 | Colangelo | |
| 2019/0308066 | A1 | 10/2019 | Rusch | |
| 2019/0351282 | A1 | 11/2019 | Rice | |
| 2020/0353307 | A1 | 11/2020 | Zanyk | |

OTHER PUBLICATIONS

International Search Report and Written Opinion in PCT/US2019/063944, mailed Mar. 4, 2020, 13 pages.

* cited by examiner

FOOT-BASED MASSAGE APPARATUS

CROSS-REFERENCE TO RELATED APPLICATION

This application is a continuation of U.S. application Ser. No. 16/262,040 filed on Jan. 30, 2019 and granted as U.S. Pat. No. 11,612,542 on Mar. 28, 2023, the entire disclosure of which is hereby incorporated by reference herein.

TECHNICAL FIELD

This disclosure relates to generally to massage techniques, and more particularly to methods and apparatuses for supporting practitioners of foot-based massage techniques.

BACKGROUND

Massage practitioners have not been exempt from the increasing influence of alternative and Eastern medicine in the west. Shiatsu and Thai-Massage are examples of modalities that allow massage practitioners to utilize a much wider range of body mechanics than the Swedish-styles prevalent in Europe and North America. With this wider range, massage practitioners reduce fatigue and minimize the risk of repetitive-use injuries in the upper body.

One such modality derived from Eastern influences is foot-based massage where massage practitioners use gravity and their body weight to massage patients. The nature of foot-based massage often requires structural support for balance. Because of this, massage practitioners frequently use either an overhead rope fastened to an end of a room for support or a set of overhead bars that are either mounted to the ceiling or part of a bulky apparatus to administer a foot-based massage.

SUMMARY

Methods and apparatuses for supporting practitioners of foot-based massage techniques are disclosed herein. According to a first implementation, a method of administering a massage comprises providing a base member with a flexible member coupled to opposite sides of the base member. The base member is rested on top of a support surface so that connection points where the flexible member attaches to the base member are vertically disposed above the support surface. A patient is positioned on the base member and the support surface so that the patient is laying between the opposite sides of the base member. Force is delivered to the patient laying on the base member using a foot of a massage practitioner. The massage practitioner utilizes the flexible member to assist with balance of the massage practitioner while the force is delivered to the patient.

According to a second implementation, a method of administering a massage, comprises providing a base member with an elongated flexible member attached to the base member. The base member is rested on top of a support surface so that connection points where the elongated flexible member attaches to the base member are vertically disposed above a bottom surface of the base member. A patient is positioned on the base member. Force is delivered to the patient on the base member using a foot of a massage practitioner. The massage practitioner utilizes the elongated flexible member to assist with balance of the massage practitioner while the force is delivered to the patient.

According to a third implementation, a method of administering a massage, comprises providing a base member with an elongated flexible member attached to the base member. The base member is rested on a support surface so that connection points where the elongated flexible member attaches to the base member are vertically disposed above a bottom surface of the base member. A patient support member is rested on the base member and the support surface so that a first portion of the patient support member is on top of both the base member and the support surface and a second portion of the patient support member extends beyond the base member and is on top of support surface. A patient is positioned on the patient support member so that the patient is laying on and supported by both the first portion and the second portion of the patient support member. Force is delivered to the patient laying on the patient support member using a foot of a massage practitioner. The massage practitioner utilizes the elongated flexible member to assist with balance of the massage practitioner while the force is delivered to the patient.

BRIEF DESCRIPTION OF THE DRAWINGS

The disclosed methods and apparatuses are best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Figure 1:
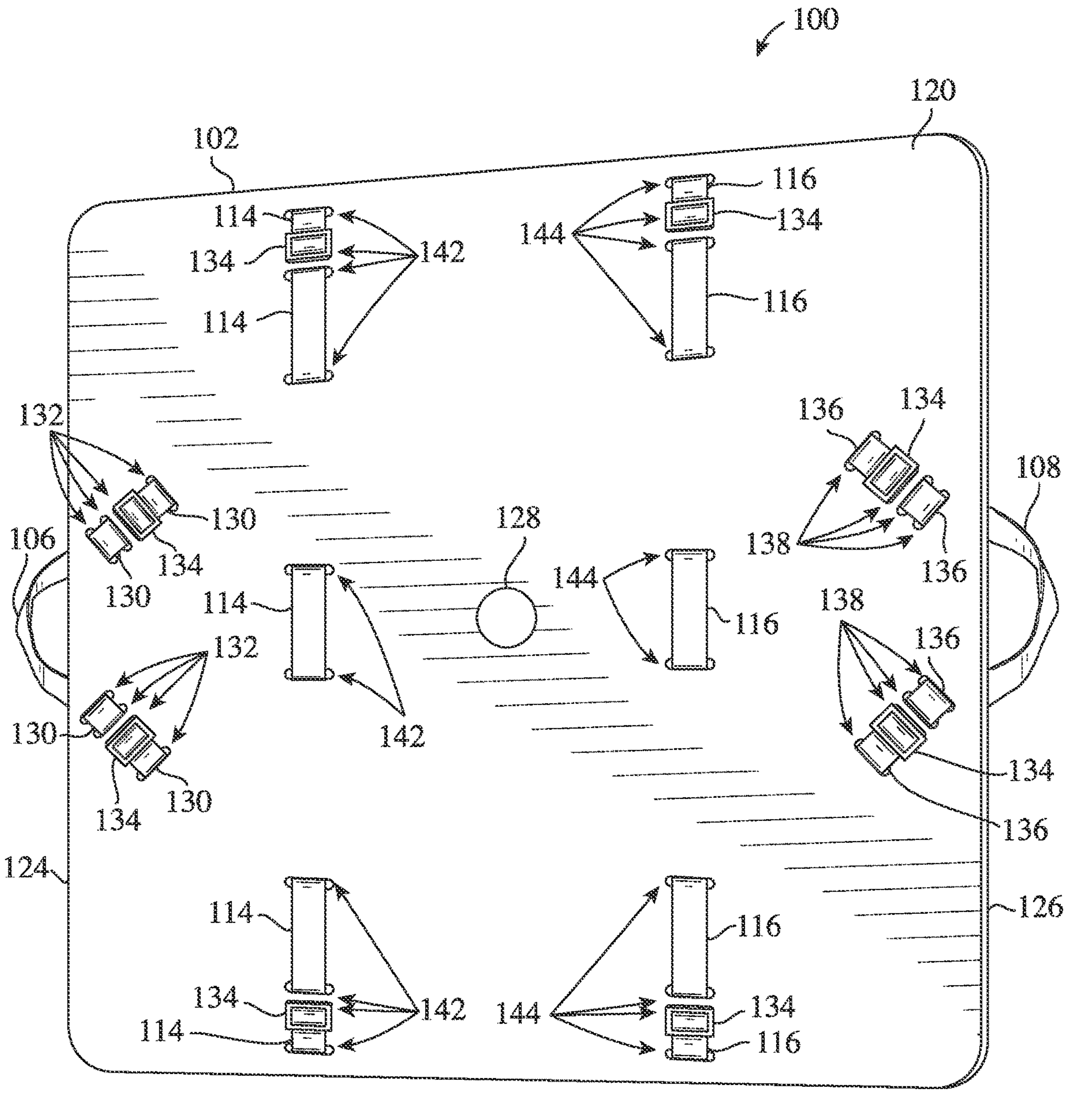
FIG. 1 is a top view of the foot-based massage apparatus.

The use of overhead ropes, overhead bars, or other mounted apparatuses to administer a foot-based massage require installation with designated mounting tools and equipment. Other bulky foot-based massage apparatuses occupy an excessive amount space and are not portable. To avoid the need for installation, mounting equipment, and tools, and to optimize the use of space, a foot-based massage apparatus may be used.

The foot-based massage apparatus 100 includes a base member 102 resting on a supporting surface (not shown) and disposed underneath a patient 104. A first connector member 106 and a second connector member 108 are coupled to the base member 102. A flexible member 110 is coupled to the first connector member 106 and the second connector member 108. The flexible member 110 assists a massage practitioner 112 in maintaining her balance while administering a foot-based massage to the patient 104. The foot-based massage apparatus 100 optionally includes a patient support member 118 disposed between the base member 102 and the patient 104. The foot-based massage apparatus 100 also optionally includes a first gripping member 114 and a second gripping member 116 coupled to the base member 102.

Figure 2:
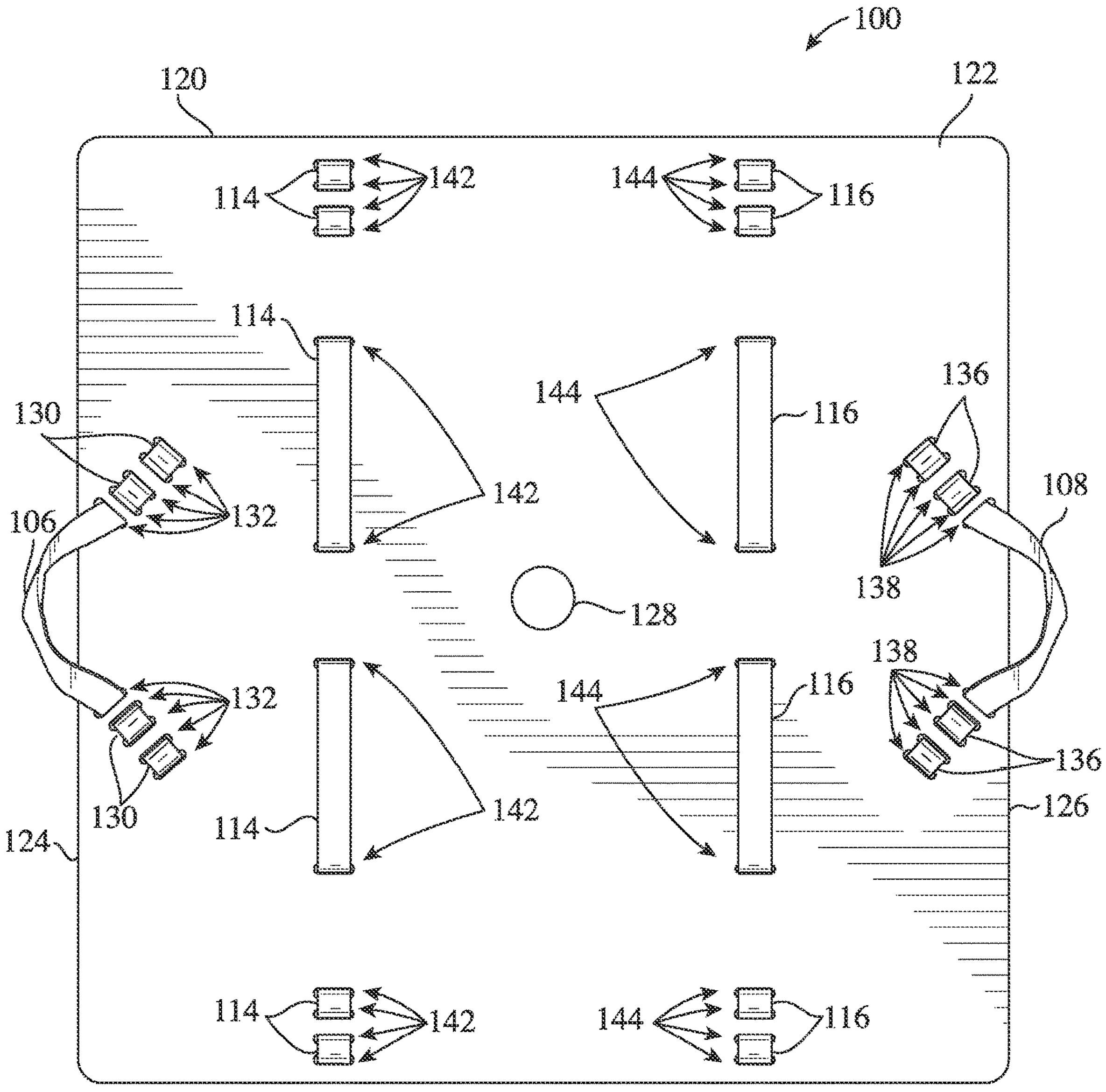
FIG. 2 is a bottom view of the foot-based massage apparatus

FIG. 1 is a top view of the foot-based massage apparatus 100. FIG. 2 is a bottom view of the foot-based massage apparatus 100. The base member 102 supports the patient 104 while the massage practitioner 112 administers the foot-based massage. A top surface 120 of the base member 102 supports a body of the patient 104 during the foot-based massage. A bottom surface 122 of the base member 102 contacts the supporting surface. The supporting surface can be any substantially planar surface capable of providing support to the patient 104, the massage practitioner 112, and the base member 102. The supporting surface can include but is not limited to a floor, a mat resting on the floor, a table, a massage table, a stationary massage table, a portable massage table, or any other surface. The base member 102 remains substantially stationary relative to the supporting surface while the foot-based massage is administered.

In the illustrated, non-limiting example, the base member 102 is a generally flat structure having a substantially rectangular shape. The four corners of the base member 102 have a substantially arcuate configuration to help prevent the flexible member 110 from becoming caught on the base member 102. The base member 102 extends between a first end portion 124 and a second end portion 126 opposite the first end portion 124. A width of the base member 102 between the first end portion 124 and the second end portion 126 is sized to accommodate an average-sized patient laying on the base member 102. The patient 104 lays on the base member 102 parallel to the edges of the first end portion 124 and the second end portion 126. The length of the base member 102 is sized to support a torso of an average-sized patient laying on the base member 102 parallel to the edges of the first end portion 124 and the second end portion 126. The base member 102 can be made of any polymer, foam, plastic, metal, wood, rubber, any other material, or any combination thereof. The base member 102 can be rigid, semi-rigid, flexible, or any combination thereof. The top surface 120 and the bottom surface 122 of the base member 102 can be smooth or can include corrugations, protrusions, recesses, apertures, or any other features.

In other embodiments, the base member 102 can be a table, massage table, stationary massage table, portable massage table, cushion, mat, or any other device sufficient to support the patient 104. The base member 102 may not be flat. The top surface 120 and/or the bottom surface 122 of the base member 102 can be curved, angular, or can be shaped in any other manner. The base member 102 can form any shape, including but not limited to any polygonal or amorphous shape. The base member 102 can have any length, width, and thickness. Corners of the base member 102 may not include an arcuate configuration and may have any curved or angular shape.

The base member 102 can include a first segment (not shown) and a second segment (not shown) that are connected using a hinge (not shown). The hinge allows the base member 102 to be moved between a folded position and an open position. The base member 102 can be moved into the folded position to store the foot-based massage apparatus 100 and/or to increase the portability of the foot-based massage apparatus 100. In the folded position, the first segment is superimposed on the second segment. The base member 102 can be moved from the folded position to the open position to administer a foot-based massage. In the open position, the first segment and the second segment are substantially planar with one another. In other embodiments, the base member 102 includes three or more segments connected using hinges. The base member 102 can be moved into the folded position such that each of the segments is superimposed on one another. In the open position, each of the segments is substantially planar with one another.

In embodiments of the base member 102 including one or more hinges, the foot-based massage apparatus 100 can include one or more locking mechanisms (not shown) configured to prevent the base member 102 from being moved from the open position to the folded position. The locking mechanisms can be connected to the hinge and/or to one or more portions of the base member 102 that are adjacent to the hinge. The locking mechanisms can lock the base member 102 in the open position temporarily or permanently. For example, one or more clamps could be fastened to the first segment and the second segment to temporarily restrain the first segment and the second segment in the open position. Alternatively, screws or bolts could be inserted through the first segment and the second segment to semi-permanently restrain the first segment and the second segment in the open position.

The base member 102 optionally includes a grip aperture 128. The massage practitioner 112 or any other person can extend a hand through the grip aperture 128 to lift and/or carry the base member 102. The grip aperture 128 is a circular aperture defined by the base member 102. In other embodiments, the grip aperture 128 can have an elliptical, rectangular, or any other shape. The grip aperture 128 is centered along the width of the base member 102 between the first end portion 124 and the second end portion 126. The grip aperture 128 is centered along the length of the base member 102. The grip aperture 128 can be defined by the base member 102 in any other location. The grip aperture 128 has a diameter substantially equal to the width of an average human hand. In other embodiments, the grip aperture 128 can have any diameter, length or width.

The first connector member 106 and the second connector member 108 connect the flexible member 110 to the base member 102. In the illustrated, non-limiting example, the first connector member 106 and the second connector member 108 are fabric straps coupled to the first end portion 124 and the second end portion 126 of the base member 102 respectively. The first connector member 106 and the second connector member 108 can include nylon, polyester, any other fabric, or any combination thereof. The first connector member 106 includes two opposing end segments 130. Each of the end segments 130 extends through one or more first connector member apertures 132 defined by the base member 102. As shown in FIGS. 1 and 2, the end segments 130 extend through the first connector member apertures 132 such that alternating portions of the end segments 130 are disposed on the top surface 120 and the bottom surface 122 of the base member 102. The end segments 130 are connected to the base member 102 using strap connectors 134. A length of the first connector member 106 is adjustable using the strap connectors 134. The strap connectors 134 can include, but are not limited to, strap cam buckles, strap ratchets, strap adjusters, strap loops, or strap reducers. The end segments 130 form approximately a 90° angle relative to each other. In other embodiments, the end segments 130 can form any other angle relative to each other.

The second connector member 108 includes two opposing end segments 136. Each of the end segments 136 extends through one or more second connector member apertures 138 defined by the base member 102. As shown in FIGS. 1 and 2, the end segments 136 extend through the second connector member apertures 138 such that alternating portions of the end segments 136 are disposed on the top surface 120 and bottom surface 122 of the base member 102. The end segments 136 are connected to the base member 102 using the strap connectors 134 previously described. A length of the second connector member 108 is adjustable using the strap connectors 134. The end segments 136 form approximately a 90° angle relative to each other. In other embodiments, the end segments 136 can form any other angle relative to each other.

In other embodiments, the base member 102 may not include the first connector member apertures 132 and the second connector member apertures 138. The first connector member 106 and the second connector member 108 can be connected to the base member 102 using rivets, snaps, adhesive, plastic welding, any other fastener, or any other means of attachment. Instead of fabric straps, the first connector member 106 and the second connector member 108 can include clasps, rings, collars, hooks, eyes, or any other connector that couples the flexible member 110 to the base member 102. In some embodiments, the first connector member 106 and the second connector member 108 are integral with the base member 102. For example, the base member 102 may define apertures at the first end portion 124 and the second end portion 126 through which the flexible member 110 extends.

The flexible member 110 is coupled to the first connector member 106 and the second connector member 108. The flexible member 110 is used by the massage practitioner 112 to assist with balance of the massage practitioner 112 while delivering the foot-based massage. For example, when tension is applied to the flexible member 110, the flexible member 110 supports the massage practitioner providing the foot-based massage. While administering the foot-based massage, the massage practitioner 112 can apply tensional force to the flexible member 110 to apply force to the patient 104 using a foot of the massage practitioner 112. In the illustrated, non-limiting example, the flexible member 110 is a strip of two-way stretch polyester lycra or tricot nylon. The flexible member 110 is approximately 38 inches wide and has a length of approximately twice the height of the massage practitioner 112. One end of the flexible member 110 is tied to the first connector member 106 and an opposing end of the flexible member 110 is tied to the second connector member 108. This configuration allows the flexible member 110 to comfortably and snuggly rest on one or both shoulders of the massage practitioner 112 while the massage practitioner 112 is standing or sitting on the base member 102 or on the supporting surface.

In other embodiments, the flexible member 110 can be a rope, a strap, or any other elongated, flexible structure. The flexible member 110 can be made of any fabric, plastic, elastic, or other material. The flexible member 110 can have any length and any width. The flexible member 110 can be coupled to the first connector member 106 and the second connector member 108 using rivets, snaps, hooks, plastic welding, adhesive, buttons, interference fit, any other fastener, or any other means of attachment. The flexible member 110 can be coupled to the first connector member 106 and the second connector member 108 permanently or temporarily. The flexible member 110 can integral with the base member 102 and/or with the first connector member 106 and the second connector member 108. In other embodiments, the foot-based massage apparatus 100 can include a first flexible member coupled to the first connector member 106 and a second flexible member connected to the second connector member 108.

Figure 3:
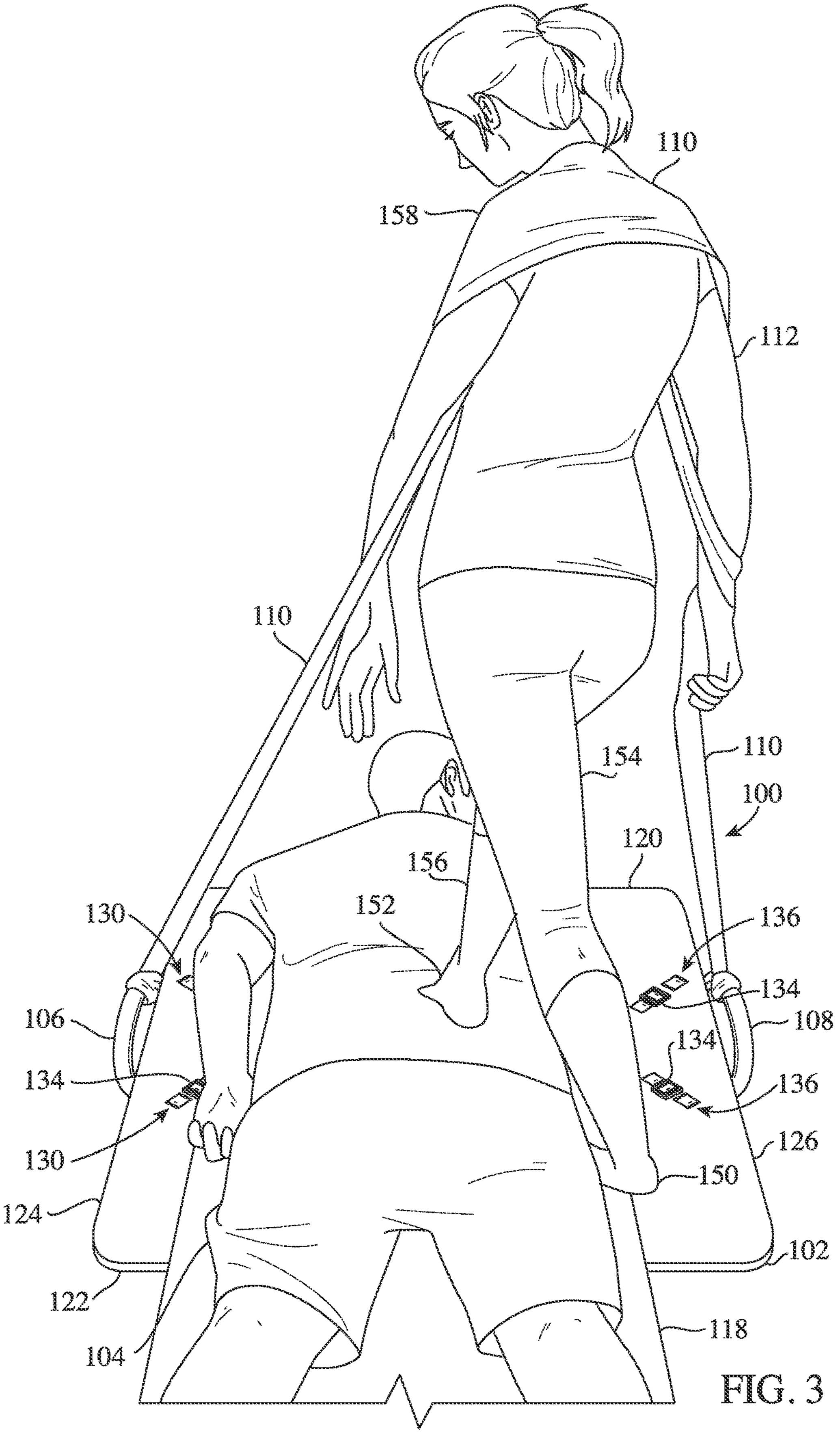
FIG. 3 is a perspective view of a massage practitioner giving a foot-based massage to a patient using the foot-based massage apparatus.

FIG. 3 shows the foot-based massage apparatus 100 being used by the massage practitioner 112 to administer the foot-based massage to the patient 104. The optional patient support member 118 is shown disposed between the patient 104 and the base member 102. The patient support member 118 cushions contact between the patient 104 and the base member 102. The patient 104 lays down or sits on the patient support member 118 during the foot-based massage. In the illustrated, non-limiting example, the patient support member 118 is a rectangular foam mat resting on the top surface 120 of the base member 102. A length of the patient support member 118 is greater than the length of the base member 102. A width of the patient support member 118 is less than the width of the base member 102 between an edge of the first end portion 124 and an edge of the second end portion 126. The patient support member 118 is held substantially stationary relative to the base member 102 due to friction between the patient support member 118 and the base member 102.

In other embodiments, the patient support member 118 can include any type of yoga mat, massage mat, Thai mat, portable massage table, pillow, cushion, or other suitable device. The patient support member 118 can be made of any plastic, foam, polymer, rubber, fabric, any other suitable material, or any combination thereof. The patient support member 118 can be of any shape and may have any length, width, and thickness. In some embodiments, the patient support member 118 may be coupled to the base member 102 using rivets, snaps, hooks, bolts, screws, interference fit, adhesive, plastic welding, or any other fastener. The patient support member 118 can be coupled to the base member 102 temporarily or permanently. The patient support member 118 can be integral with the base member 102.

The optional first gripping member 114 and the optional second gripping member 116 restrict movement of the base member 102 relative to the supporting surface. This allows the base member 102 to remain substantially stationary relative to the supporting surface during the foot-based massage. The first gripping member 114 and the second gripping member 116 can also restrict movement of the patient support member 118 relative to the base member 102. The patient support member 118 can be coupled to the first gripping member 114 and the second gripping member 116. For example, the patient support member 118 can rest on the first gripping member 114 and the second gripping member 116. In other embodiments, the first gripping member 114 and the second gripping member 116 can be connected to the patient support member 118 using adhesive, interference fit, plastic welding, snaps, rivets, or any other means of attachment.

In the illustrated, non-limiting example, the first gripping member 114 is a rubber strip coupled to the base member 102 between the first end portion 124 and the second end portion 126. The first gripping member 114 is substantially parallel to the edge of the first end portion 124. In other embodiments, the first gripping member 114 can be coupled to the base member 102 in any orientation. The first gripping member 114 extends along the length of the base member 102. The first gripping member 114 extends through first apertures 142 defined by the base member 102 such that the first gripping member 114 is disposed on the top surface 120 of the base member 102 and on the bottom surface 122 of the base member 102. For example, alternating portions of the first gripping member 114 can be disposed on the top surface 120 and the bottom surface 122. This configuration allows the first gripping member 114 to contact the supporting surface and/or the patient support member 118. The friction between the first gripping member 114 and the supporting surface restricts movement of the base member 102 relative to the supporting surface. The friction between the first gripping member 114 and the patient support member 118 restricts movement of the patient support member 118 relative to the base member 102. The first gripping member 114 is connected to the base member 102 using one or more of the strap connectors 134. A length of the first gripping member 114 is adjustable using the strap connectors 134.

In the illustrated, non-limiting example, the second gripping member 116 is a rubber strip coupled to the base member 102 between the first end portion 124 and the second end portion 126. The second gripping member 116 is substantially parallel to the edge of the second end portion 126. The second gripping member 116 extends along the length of the base member 102. In other embodiments, the second gripping member 116 can be coupled to the base member 102 in any orientation. The second gripping member 116 may or may not be parallel to the first gripping member 114. The second gripping member 116 extends through second apertures 144 defined by the base member 102 such that the second gripping member 116 is disposed on the top surface 120 of the base member 102 and on the bottom surface 122 of the base member 102. For example, alternating portions of the second gripping member 116 can be disposed on the top surface 120 and the bottom surface 122. This configuration allows the second gripping member 116 to contact the supporting surface and/or the patient support member 118. The friction between the second gripping member 116 and the supporting surface restricts movement of the base member 102 relative to the supporting surface. The friction between the second gripping member 116 and the patient support member 118 restricts movement of the patient support member 118 relative to the base member 102. The second gripping member 116 is connected to the base member 102 using one or more of the strap connectors 134. A length of the second gripping member 116 is adjustable using the strap connectors 134.

In other embodiments, the first gripping member 114 and the second gripping member 116 may be made of any fabric, rubber, plastic, polymer, foam, or any other suitable material or combination thereof. The first gripping member 114 and the second gripping member 116 can be of any length, width, and thickness. The first gripping member 114 and the second gripping member 116 may extend along any length of the base member 102. In some embodiments, the base member 102 may not include the first apertures 142 and the second apertures 144. Instead of rubber strips, the first gripping member 114 and the second gripping member 116 can be portions of slip resistant material of any shape connected to the top surface 120 and/or the bottom surface 122. The first gripping member 114 and the second gripping member 116 can also comprise adhesive, hooks, loops, rings, hook and loop fasteners, rivets, buttons, snaps, or any other fasteners that connect to the patient support member 118 and/or the base member 102. The first gripping member 114 and the second gripping member 116 can be coupled to the top surface 120 and/or the bottom surface 122 of the base member 102 using adhesive, plastic welding, snaps, rivets, or any other means of attachment. The first gripping member 114 and the second gripping member 116 can be integral with the base member 102. For example, the first gripping member 114 and the second gripping member 116 can be protrusions extending from the top surface 120 and/or the bottom surface 122.

Figure 4:
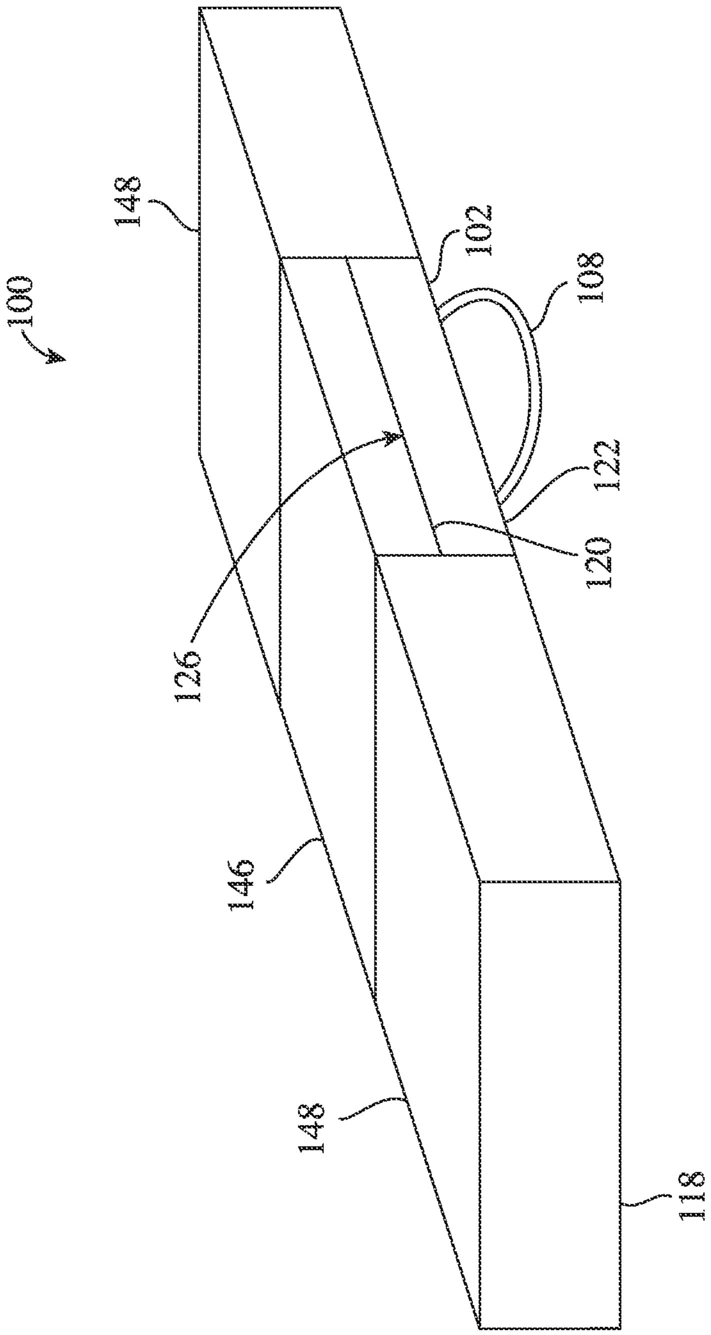
FIG. 4 is a perspective view of the foot-based massage apparatus in which the base member is an insert into the patient support member.

FIG. 4 shows an embodiment of the foot-based massage apparatus 100 in which the base member 102 is an insert into the patient support member 118. The patient support member 118 is shown in an open position. In the illustrated, non-limiting example, the patient support member 118 is tri-fold mat having a middle segment 146 and two opposing end segments 148. As previously described, the patient support member 118 can include any type of yoga mat, massage mat, Thai mat, portable massage table, pillow, cushion, or other suitable device. The middle segment 146 and the end segments 148 have a substantially rectangular shape and are substantially equal in shape and size. The tri-fold mat can be made of any foam, vinyl, or any other suitable material. The middle segment 146 and the end segments 148 can be of any size or shape. The middle segment 146 and the end segments 148 may not be equal in size and/or shape. In other embodiments, the patient support member 118 includes more or less than three segments that are hingedly connected.

In the illustrated, non-limiting example, the middle segment 146 is hingedly connected to the end segments 148. A first hinge is connected to one end of the middle segment 146 near a top surface of the middle segment 146. A second hinge is connected to the opposing end of the middle segment 146 near a bottom surface of the middle segment 146, where the bottom surface is opposite the top surface. The first hinge is connected to one of the end segments 148 and the second hinge is connected to the other end segment 148. In other embodiments, the first hinge and the second hinge are connected to any portion of the middle segment 146. More or less than two hinges may be connected to the middle segment 146.

The patient support member 118 is movable between an open position and a folded position. In the open position, the middle segment 146 and the end segments 148 are substantially planar with one another. In the open position, the patient support member 118 can support the patient 104 during the foot-based massage.

The patient support member 118 may include one or more of the previously described locking mechanisms (not shown) configured to prevent the patient support member 118 from being moved from the open position to the folded position. The locking mechanisms can be connected to hinges between the middle segment 146 and the end segments 148 and/or to one or more portions of the patient support member 118 that are adjacent to the hinges. The locking mechanisms can lock the patient support member 118 in the open position temporarily or permanently.

A portion of the patient support member 118 defines a recess having an interior profile corresponding to an exterior profile of the base member 102. In the illustrated, non-limiting example, the recess is defined in the bottom surface of the middle segment 146. In other embodiments, the recess may be defined by any portion of the patient support member 118. The base member 102 is inserted into the recess of the patient support member 118. Once inserted, the patient support member 118 is moved to the open position. While inserted, the massage practitioner 112 can use the base member 102 to administer the foot-based massage while the patient 104 lays on the patient support member 118. When inserted into the recess, the base member 102 is oriented such that the first connector member 106 and the second connector member 108 are disposed on opposing sides of the middle segment 146. When inserted into the recess, the base member 102 can be coupled to the patient support member 118 using rivets, snaps, hooks, bolts, screws, interference fit, adhesive, plastic welding, hook and loop connectors, any other fastener, or any other means of attachment. The base member 102 can be coupled to the patient support member 118 permanently or temporarily.

In other embodiments, the patient support member 118 does not define the recess. The patient support member 118 can be sized and shaped such that the base member 102 can be disposed on top of or under the patient support member 118 to support the patient 104 during the foot-based massage. For example, the middle segment 146 can have a lesser thickness than the end segments 148. When the patient support member 118 is moved to the open position and the middle segment 146 is placed on the base member 102, the top surfaces of the middle segment 146 and the end segments 148 are substantially planar to one another.

Figure 5:
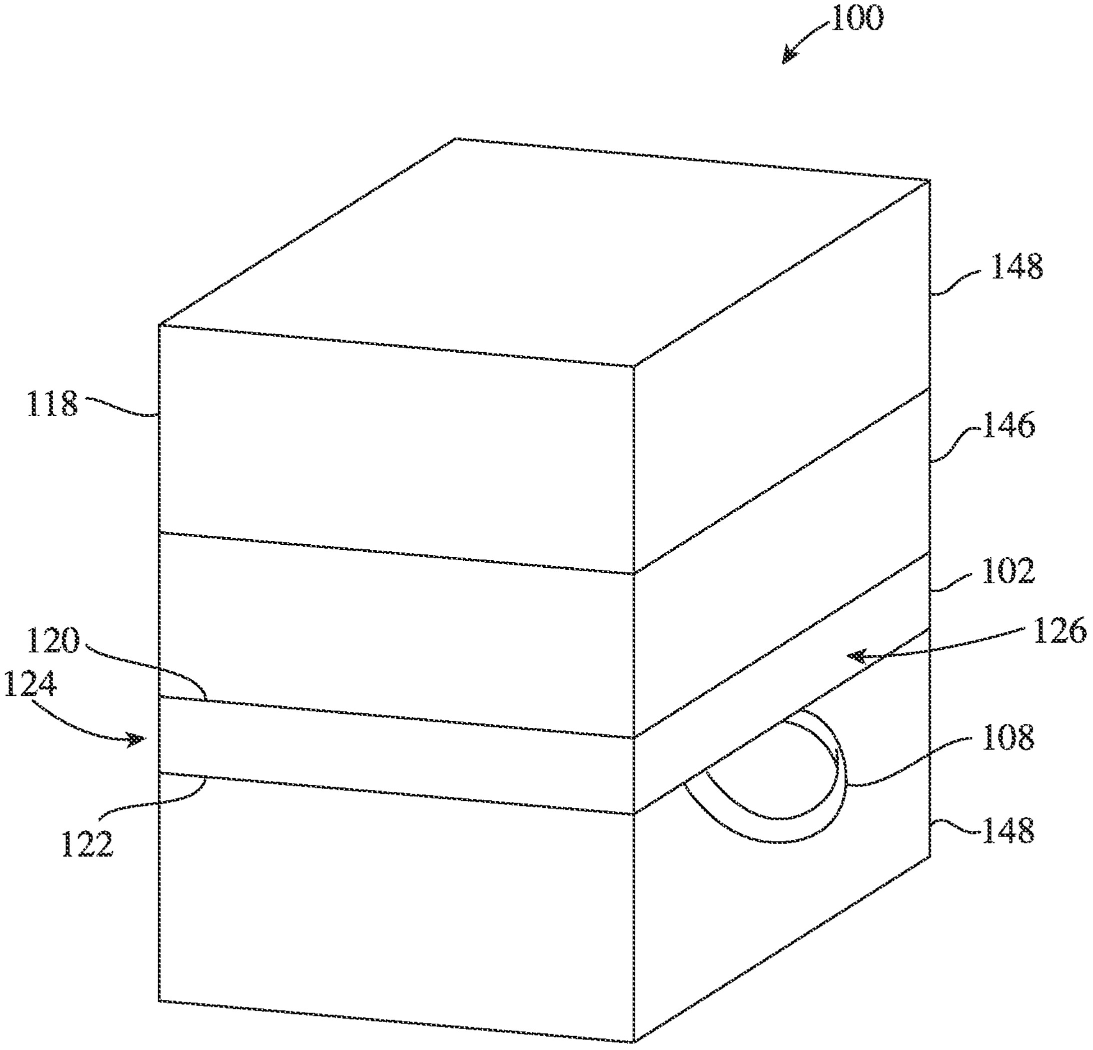
FIG. 5 is a perspective view of the foot-based massage apparatus from FIG. 4 in a folded position.

FIG. 5 shows the embodiment of the foot-based massage apparatus 100 shown in FIG. 4 in a folded position. The patient support member 118 can be folded from the open position to the folded position to transport or store the foot-based massage apparatus 100. In the illustrated, non-limiting example, patient support member 118 is folded such that the end segments 148 are superimposed on the middle segment 146. One of the end segments 148 is moved to contact a top surface of the middle segment 146. The other of the end segments 148 is moved to contact a bottom surface of the middle segment 146, where the top surface is opposite the bottom surface. The end segments 148 and the middle segment 146 can be folded into any other orientation. The patient support member 118 can be folded with or without the base member 102 inserted into the recess or coupled to the patient support member 118.

Referring back to FIG. 3, the massage practitioner 112 uses her left foot 150 and right foot 152 to administer the foot-based massage to the patient 104 laying on the base member 102. During the massage, the patient is supported by a portion of the base member 102 between the first connector member 106 and the second connector member 108. The patient 104 is substantially parallel to the base member 102 and lays perpendicularly to an axis extending between the first connector member 106 and the second connector member 108. The massage practitioner 112 stands with one or both feet 150, 152 on the base member 102, the patient support member 118, and/or the supporting surface. In the illustrated, non-limiting example, the patient 104 is in a prone position while the massage is administered by the massage practitioner 112. The massage can also be administered by the massage practitioner 112 while the patient 104 is in a supine position.

In the illustrated, non-limiting example, the massage practitioner 112 supports the bulk of her weigh on her left leg 154, which is resting on the base member 102 adjacent to the patient 104. A substantially right angle can be formed between the base member 102 and a supporting leg, in this example the left leg 154. The massage is administered to the patient 104 using a foot of the massage practitioner's non-supporting leg, in this example the right foot 152 and right leg 156. It is possible for the massage practitioner 112 to simultaneously use both her left foot 150 and her right foot 152 to deliver the massage. Alternatively, the massage practitioner 112 can use her left foot 150 to administer the massage while resting her right leg 156 on the base member 102 adjacent to the patient 104.

A mid-section of the flexible member 110 rests on shoulders 158 of the massage practitioner 112. The flexible member 110 has a generally triangular configuration extending substantially perpendicular from the base member 102 while the foot-based massage is being administered. The ends of the flexible member 110 are spaced apart from one another in a direction that is substantially perpendicular to the direction in which the patient 104 is laying. This allows the massage practitioner 112 to use tensional force, in addition to gravitational force, to administer the foot-based massage to the patient 104. By applying tensional force to the flexible member 110, the massage practitioner 112 can apply greater force to the patient 104 with one or both of the massage practitioner's feet 150, 152.

In summary, the foot-based massage apparatus can be used to perform a process of administering a foot-based massage. A first step includes coupling one end of the flexible member 110 to the first connector member 106, where the first connector member 106 is coupled to the base member 102. A second step includes coupling the opposing end of the flexible member 110 to the second connector member 108, where the second connector member 108 is coupled to the base member 102 opposite the first connector member 106. The first and second steps can include tying each end of the flexible member 110 to one of the first and second connector members 106, 108. A third step includes delivering force to the patient 104 supported by the base member 102 using a foot of the massage practitioner 112. A fourth step includes utilizing the flexible member 110 to assist with balance of the massage practitioner 112 while the force is delivered to the patient 104. The process can include applying tensional force to the flexible member 110 while delivering force to the patient 104.

The process can be performed while the patient 104 is supported by a portion of the base member 102 between the first connector member 106 and the second connector member 108 such that a body of the patient 104 is substantially perpendicular to the axis extending from the first connector member 106 to the second connector member 108. A portion of the first connector member 106 extends through the first connector member apertures 132 defined by the base member 102. A portion of the second connector member 108 extends through the second connector member apertures 138 defined by the base member 102. The base member 102 is supported by the supporting surface. The base member includes a gripping member in contact with the supporting surface such that the gripping member restricts motion of the base member 102 relative to the supporting surface. The gripping member includes features similar to those of the first gripping member 114 and/or the second gripping member 116.

While the disclosed methods and apparatus have been described in connection with certain embodiments or implementations, it is to be understood that the invention is not to be limited to the disclosed embodiments and implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method of administering a massage, comprising:

providing a base member with an elongated flexible member attached to the base member;

resting the base member on a support surface so that connection points where the elongated flexible member attaches to the base member are vertically disposed above a bottom surface of the base member;

resting a patient support member on the base member and the support surface so that a first portion of the patient support member is on top of both the base member and the support surface and a second portion of the patient support member extends beyond the base member and is on top of support surface;

positioning a patient on the patient support member so that the patient is laying on and supported by both the first portion and the second portion of the patient support member;

delivering force to the patient laying on the patient support member using a foot of a massage practitioner; and utilizing, by the massage practitioner, the elongated flexible member to assist with balance of the massage practitioner while the force is delivered to the patient.

2. The method of claim 1, wherein a top surface of the base member is in contact with the first portion of the patient support member.

3. The method of claim 1, wherein the support surface is in contact with the bottom surface of the base member.

4. The method of claim 1, wherein one of the connection points is disposed on a first connector member and another of the connection points is disposed on a second connector member.

5. The method of claim 4, wherein at least one of the first connector member or the second connector member is a fabric strap.

6. The method of claim 4, wherein ends of the elongated flexible member are tied to the first connector member and the second connector member.

7. The method of claim 1, wherein a distance between the connection points is greater than a width of the base member.

8. The method of claim 1, wherein a distance between the connection points is greater than a width of the first portion of the patient support member.

9. The method of claim 1, wherein a width of the base member is greater than a width of the first portion of the patient support member.

10. The method of claim 1, wherein a portion of the elongated flexible member rests on shoulder of the massage practitioner while the force is delivered to the patient.

11. The method of claim 1, wherein a portion of the elongated flexible member is wrapped around a hand of the massage practitioner while the force is delivered to the patient.

* * * * *